Patented July 14, 1931

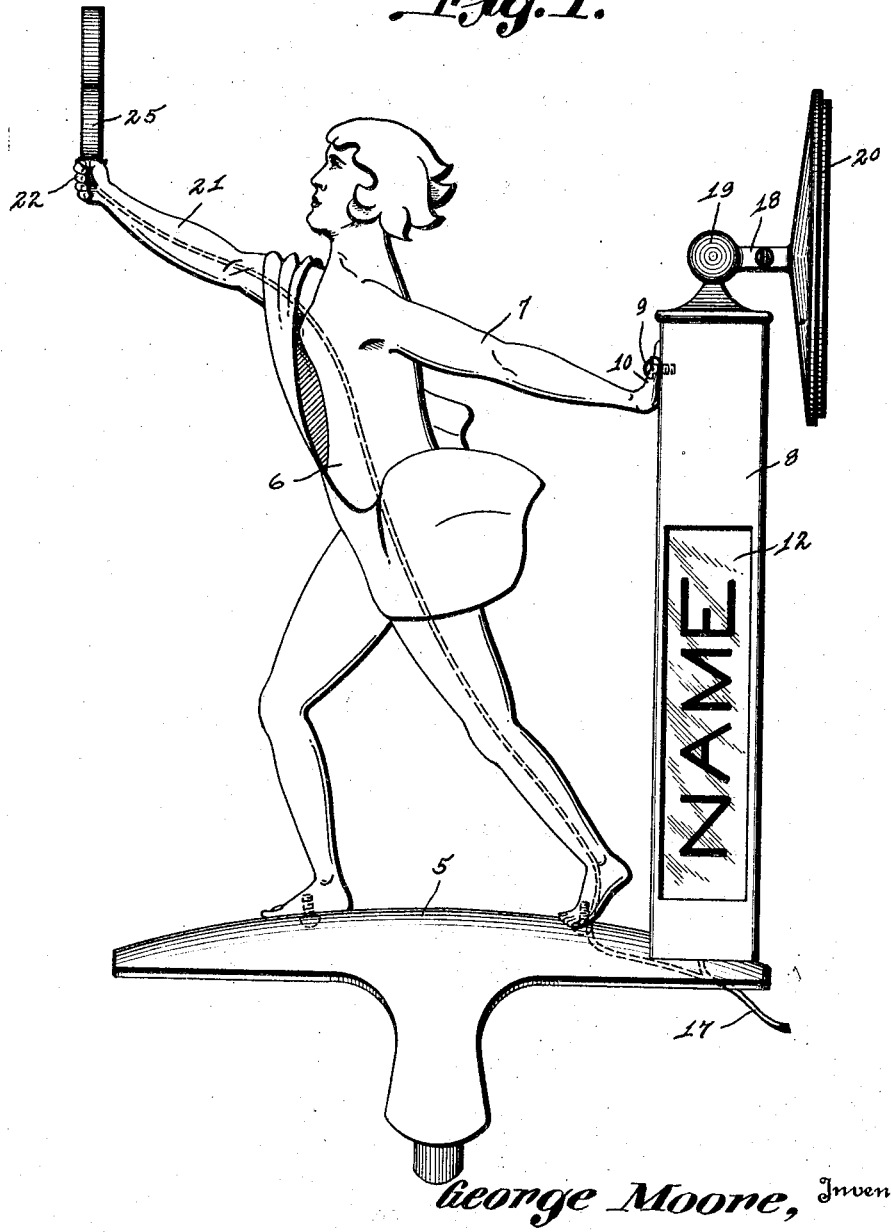

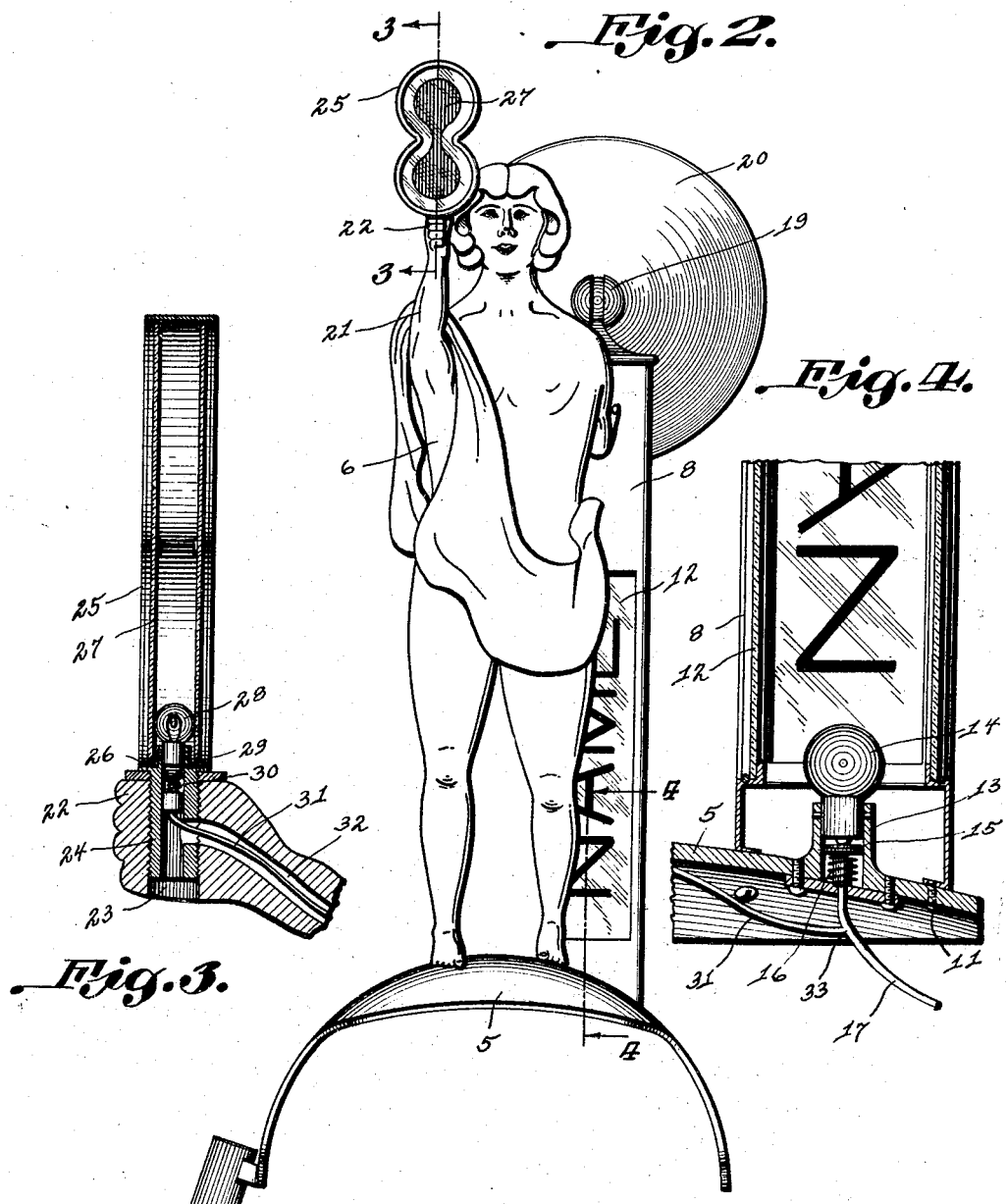

1,814,728

UNITED STATES PATENT OFFICE

GEORGE MOORE, OF FLINT, MICHIGAN

COMBINED REAR VIEW MIRROR AND PARKING LIGHT FOR AUTOMOBILES

Application filed June 5, 1930. Serial No. 459,403.

My invention relates to a combined rear view mirror and parking light for automobiles.

It is an object of the invention to provide a device of the above-mentioned character which may be readily attached to the conventional type of automobile and which is ornamental in appearance so as to add to the attractiveness of the automobile.

A further object of the invention is to provide a device of the above-mentioned character which is simple and durable in construction, reliable and efficient in use and inexpensive to manufacture.

Other objects and advantages of the invention will be apparent during the course of the following description.

In the accompanying drawings, forming a part of this specification and in which like numerals are employed to designate like parts throughout the same, Fig. 1 is a side elevational view of the device, Fig. 2, is a front view of the same, Fig. 3, is a longitudinal sectional view taken on lines 3—3 of Fig. 2, and, Fig. 4, is a section taken on lines 4—4 of Fig. 2.

In the drawings, wherein for the purpose of illustration, I have shown a preferred embodiment of my invention, the numeral 5 denotes the conventional type of spare tire clamp which secures the tire in the fender well of an automobile. Mounted on top of the clamp is the figure of a woman 6 having one arm 7 extending rearwardly and connected to one side of the square tubular post 8 by the screw 9 which goes through the hand 10 of the arm. The lower end of the post is attached to the clamp 5 by screws 11 and the sides of the post for a portion of their length are provided with glass panes 12 on which the name of the automobile appears. Mounted in the clamp 5 within the lower end of the post is a socket 13, adapted to receive the electric light bulb 14, which engages the electrical contact plate 15, held in contact therewith by the coil spring 16. The contact plate 15 has connection with an electric wire 17 leading to a switch mounted on the dash-board of the automobile, not shown, the switch being connected to the battery of the automobile, not shown. An arm 18 is connected to the upper end of the post at right angles thereto, by the ball and socket joint 19, and a mirror 20 is supported by the outer end of the arm 18. The other arm 21 of the figure extends forwardly and upwardly, the hand 22 having a vertical bore 23, in which the socket 24 is adapted to be screwed. Mounted in an upright position on the hand 22 is a relatively flat casing 25 shaped like the figure 8, which is secured to the hand by the flange 26 extending from the socket 24. The sides of the casing 25 are provided with glass panes 27 and mounted in the upper end of the socket 24, within the casing is an electric light bulb 28, which engages the contact plate 29, held in contact therewith by the coil spring 30. The contact plate 29 has connection with the electric wire 31 which is concealed in the passage 32 extending through the figure 6 and has connection with the wire 17, as at 33.

In use, it will be seen that the clamp 5 may be readily substituted for the conventional spare tire clamp now employed to secure the spare tire in the fender well of automobiles. When attached to the spare tire the device serves as an ornament which is highly attractive in appearance and the mirror 20 provides a rear view mirror for the driver of the automobile, which gives a clear and unobstructed view of the roadway to the rear of the automobile. When the switch on the dash-board for controlling the lights 14 and 28 is closed the panes 12 mounted in the sides of the post 8 are illuminated and are visible from all sides of the automobile. Likewise the panes 27 of the casing 25 are illuminated and are clearly visible from the front and rear of the vehicle. Thus, it is seen that when the lights are turned on the post 8 and casing 25, provide parking lights which are attractive in appearance. Furthermore, the casing 25 by reason of its configuration denotes the number of cylinders of the automobile and the panes of the post 8 have the name of the automobile printed thereon.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. A device of the character described comprising a spare tire clamp, a human figure mounted on said clamp having one arm extending forwardly and upwardly, a parking lamp mounted on the outer end of said arm, a tubular post mounted on said clamp to the rear of said figure having transparent name plates mounted in its sides, an electric light bulb mounted in said post having electrical connection with the light of said parking lamp and a rear view mirror adjustably mounted on the upper end of said post.

2. A device of the character described comprising a clamp, a figure mounted on said clamp, a parking lamp mounted on the figure, a tubular post mounted on said clamp to the rear of said figure having transparent name plates mounted in its sides, an electric light bulb mounted in said post having electrical connection with the light of said parking lamp and a rear view mirror adjustably carried by said post.

In testimony whereof I affix my signature.

GEORGE MOORE.